United States Patent [19]

Sherman et al.

[11] Patent Number: 5,169,435
[45] Date of Patent: Dec. 8, 1992

[54] AQUEOUS RETARDER PRINTING INK COMPOSITION AND METHOD OF USING THE COMPOSITION

[75] Inventors: Scott A. Sherman, Woodstown, N.J.; Peter T. Feeney, New Castle, Del.

[73] Assignee: Mannington Mills, Salem, N.J.

[21] Appl. No.: 55,796

[22] Filed: Jun. 1, 1987

[51] Int. Cl.$^5$ .............................................. C09D 11/00
[52] U.S. Cl. .................................. 106/20 R; 264/52; 264/DIG. 82; 427/243; 521/72; 106/20 C
[58] Field of Search ........... 106/20; 264/52, DIG. 82; 427/243; 521/72

[56] References Cited

U.S. PATENT DOCUMENTS

| | | | |
|---|---|---|---|
| 4,191,581 | 3/1980 | Hamilton | 106/20 |
| 4,258,085 | 3/1981 | Kauffman et al. | 427/244 |
| 4,277,427 | 7/1981 | Kaminski et al. | 264/45.5 |
| 4,407,882 | 10/1983 | Hauser et al. | 106/20 |

Primary Examiner—Amelia B. Yarbrough
Attorney, Agent, or Firm—Finnegan, Henderson, Farabow, Garrett & Dunner

[57] ABSTRACT

An aqueous, foam-retarding, printing ink composition consists essentially of:
(A) an aqueous thermoplastic or thermosetting printing ink;
(B) benzotriazole, fumaric acid, malic acid, hydroquinone, dodecanethiol, succinic anhydride, or adipic acid as foaming or blowing agent modifiers or inhibitors;
(C) optionally a $C_1$ to $C_6$ water soluble or water dispersible alcohol; and
(D) water.

The printing ink composition has a pH of about 3 to about 5. The composition is useful for chemically embossing heat expandable or heat foamable resinous materials. The embossed materials are useful, for example, as floor coverings.

9 Claims, No Drawings

AQUEOUS RETARDER PRINTING INK COMPOSITION AND METHOD OF USING THE COMPOSITION

BACKGROUND OF THE INVENTION

This invention relates to an aqueous, foam-retarding printing ink composition and to a method of using the composition in the manufacture of chemically embossed resinous sheet materials.

Sheets of resinous material have found widespread use as decorative and wear resistant coverings in a wide variety of products. The sheets are used extensively as floor and wall coverings. In many instances, the sheets are made by applying a resinous composition to a backing material, such as felt, paper, woven fabric or the like. The backing material provides strength and serviceability to the sheet.

The resinous sheet materials can include a resilient, cellular foam layer, which is typically formed from a resinous composition containing a foaming or blowing agent that causes the composition to expand on heating. It is known in the art that foamable, resinous sheet materials can be embossed by controlling the decomposition temperature of a catalyzed blowing or foaming agent in the heat-expandable composition. For example, by applying to the heat-expandable composition a reactive chemical compound, which is referred to in the art as a "regulator", "inhibitor", or "retarder", it is possible to modify the decomposition temperature of the catalyzed foaming or blowing agent in the area of application of the reactive compound It is thus possible to produce sheet materials having surface areas that are either depressesd or raised proximate the area of inhibitor application.

The inhibitor is conveniently incorporated in a foam-retarding, printing ink composition, which is printed over the heat-expandable resinous composition. Foam-retarding, printing ink compositions are well known. These compositions are generally based on an organic solvent carrier or vehicle system. While compositions of this type have achieved a certain degree of success, recent State and Federal EPA emission standards for volatile organic solvents (VOS) have made continued use of these compositions costly on an industrial scale. The organic solvents liberated from the compositions must either be recovered or incinerated. In either case, costly equipment and maintenance procedures are required.

In order to meet VOS emission standards, the use of aqueous-alcoholic retarder ink compositions has been proposed. While the aqueous-alcoholic printing ink compositions pose fewer emission problems, it has been reported that the pH of the compositions must be controlled in the alkaline range, and the use of ammoniacal pH regulating agents has been proposed for this purpose. Specifically, it has been proposed to use benzotriazole as a foam growth controlling agent in a aqueous-alcoholic printing ink having a pH in the range of from 8 to 12. Ammonia or other alkaline materials are used to prevent the pH from dropping below a value of about 8. See U.S. Pat. Nos. 4,191,581 and 4,083,907 to Hamilton and 4,407,882 to Hauser et al.

Aliphatic or aromatic dicarboxylic acids and their anhydrides or halides have also been suggested for use as foam inhibitors in printing ink compositions. It has been reported, however, that these inhibitors are not suitable for aqueous printing inks. See U.S. Pat. No. 4,407,882 to Hauser et al.

The use of certain organic carboxylic acids as foam inhibitors has been suggested in U.S. Pat. Nos. 4,369,065 and 4,421,561 to Brixius. The acid must be neutralized, and the foam-growth-controlling ink composition in which the neutralization product is used must have a pH between about 8 and about 12.

There exists a need in the art for an aqueous foam-retarding printing ink composition that can meet State and Federal EPA emission standards for volatile organic solvents without the need for expensive solvent recovery or incineration equipment. There also exists a need for such a composition that will provide an improved environment for workers by eliminating most organic solvent vapors and ammoniadal pH regulating and buffering agents. The composition should provide a safer work environment by reducing the possibility of combustion and fire. The composition should be adaptable for use with conventional printing equipment.

SUMMARY OF THE INVENTION

Accordingly, this invention aids in fulfilling these needs in the art by providing an aqueous, foam-retarding, printing ink composition consisting essentially of a printing ink, a foaming or blowing agent modifier or inhibitor, water, and optionally an alcohol. More particularly, the composition of this invention consists essentially of:

(A) about 40% to about 80% by weight of an aqueous thermoplastic or thermosetting printing ink;

(B) about 1% to about 25% by weight of a foaming or blowing agent modifier or inhibitor selected from the group consisting of benzotriazole, fumaric acid, malic acid, hydroquinone, dodecanethiol, succinic anhydride or adipic acid;

(C) about 0% to about 15% by weight of a water soluble or water dispersible alcohol having 1 to 6 carbon atoms; and (D) about 2% to about 33% by weight of added water.

The printing ink composition has a pH of about 3 to about 5.

This invention also provides a method for chemically embossing a heat expandable or heat foamable resinous sheet material. The process comprises providing a substrate comprising an expandable resinous layer containing a foaming or blowing agent. A printing design is provided over at least a portion of the expandable resinous layer. At least a portion of the printing design is comprised of an aqueous, foam-retarding printing ink composition of the invention as described above. The process further comprises heating the expandable resinous layer at a temperature and for a time sufficient to selectively expand the layer and thereby form an embossed region of the layer proximate the portion of the printing design that contained the foaming or blowing agent modifier or inhibitor.

The composition and method of the invention meet current State and Federal EPA emission standards for volatile organic solvents. The need for expensive solvent recovery or incineration equipment is thus eliminated. Furthermore, it is not necessary to utilize ammoniacal pH regulating or buffering agents to control the pH of the printing ink composition in an alkaline range as required in prior compositions.

DESCRIPTION OF PREFERRED EMBODIMENTS

The aqueous, foam retarding, printing ink composition of the invention is a substantially homogeneous dispersion of solids in a liquid phase, and the composition is in flowable form under the temperature and pressure conditions employed for printing the composition on a substrate.

The composition includes a printing ink that is compatible with water in the pH range of the composition. The printing ink is generally an emulsion, a solution or a mixture of a pigment in a suitable vehicle. Either thermoplastic or thermosetting printing inks can be employed. A thermoset ink can be employed where cohesive strength (wear layer bonding) of a topcoat is required, as with floor coverings. A thermoplastic composition may suffice where this requirement is absent, e.g. packaging or publication applications. The polymeric systems, e.g. the resin or binder system, can be a polyvinyl chloride for thermoplastic systems. A polymer with functionality, such as acid, can be used alone or with another functional polymer to produce a system which cures or crosslinks on heating. The printing ink that is employed must be stable in the composition of the invention at a pH of about 3 to about 5; that is the homogeniety of the composition must not be altered by chemical or physical changes in the printing ink at a pH of about 3 to about 5. Suitable printing inks are commercially available, such as from Custom Chemicals Company. The printing ink is employed in the composition of this invention in an amount of about 40% to about 80% by weight of the composition, preferably about 60% to about 70% by weight.

The printing ink composition of the invention also includes a foaming or blowing agent modifier or inhibitor selected from the group consisting of benzotriazole, fumaric acid, malic acid, hydroquinone, dodecanethiol, succinic anhydride, or adipic acid. Benzotriazole is preferred. As used herein, the term "benzotriazole" and the abbreviation "BTA" are intended to mean unsubstituted, 1,2,3-benzotriazole having the following formula:

BENZOTRIAZOLE

The foaming or blowing agent modifier or inhibitor is employed in the composition of the invention in an amount sufficient to obtain the desired depth of the embossed pattern. Generally, the amount is about 1% to about 25% by weight of the composition, preferably about 7% to 10% by weight. The larger amounts are usually employed in order to obtain greater depth in the embossed pattern, although the amount required can be affected by other factors, such as the amount of ink applied, the thickness of the layers to be embossed, the chemical blowing system employed and the particular curing conditions. The amount will also depend upon the foaming or blowing agent modifier or inhibitor that is employed. For example, about 1% to about 10% by weight benzotriazole can be employed, whereas about 20% to about 25% by weight fumaric acid is required for optimum embossing.

In order to improve the solubility or dispersibility of some of the foaming or blowing agent modifiers or inhibitors in the printing ink composition of the invention, a water soluble or water dispersible alcohol can be included in the composition. The alcohol can be a monofunctional or polyfunctional organic compound having 1 to 6 carbon atoms. Examples of suitable alcohols are methanol, ethanol, propanol, isopropanol, butanol, pentanol, and hexanol. Mixtures of alcohols can also be employed The alcohol is employed in an amount sufficient to ensure that substantially all of the foaming or blowing agent modifier or inhibitor is dissolved in, or at least uniformly dispersed in, the composition. It is generally not necessary to include an alcohol to improve dispersibility when the foaming or blowing agent modifier or inhibitor is furamic acid. Similarly, an alcohol is usually not required when the foaming or blowing agent modifier or inhibitor is malic acid, hydroquinone, dodecanethiol, succinic anhydride, or adipic acid. When the foaming or blowing agent modifier of inhibitor is benzotriazole, an alcohol is required for optimum results. Generally, the amount of the alcohol is about 1% to about 15% by weight of the composition, and preferably about 5% to about 10% by weight, when benzotriazole is employed.

In the preferred embodiment of this invention, the printing ink composition is substantially free of ketone solvents, hydrocarbon solvents, especially aromatic hydrocarbon solvents, and hydroxy-containing aromatic solvents.

The printing ink composition of the invention contains added water in an amount sufficient to achieve the final desired printing viscosity. Generally, the amount of added water in the composition is about 2% to about 33% by weight of the composition, preferably about 5% to 20% by weight. The amount of water is preferably adjusted to provide the desired printing characteristics to the composition.

The printing ink composition of the invention generally has a viscosity of about 35 sec. to about 50 sec. in a No. 2 Zahn cup. The viscosity can be adjusted to provide the proper printing consistency. For example, the viscosity can be controlled by regulating the amount of water added to the composition.

It has surprisingly been found that the pH of the printing ink composition of the invention must be in the range of about 3 to about 5, preferably a pH of about 4 to about 4.5, during preparation, storage and use of the composition. Above a pH of 5, the composition of the invention loses its integrity as a printing ink composition. For example, large increases in viscosity can occur. In addition, the composition loses homogeniety as evidenced by the localized formation of concentrated solid or semi-solid phases. This phenomenon is referred to in the art as kickout.

A pH regulating agent can be employed as needed in the composition of the invention. For example, the pH of the composition can be lowered to about 3.5 to about 4.0 by adding an acid, such as formic acid, acetic acid, or citric acid. Viscosity changes in the composition can occur with acid additions, and in this event the amount of water in the composition can be changed to make viscosity adjustments. Small amounts of alkaline substances can also be added to the composition, provided that the pH of the composition does not exceed about 5 and the composition does not lose its integrity as a printing ink.

A buffering agent can also be employed in the composition of the invention, but caution must be exercised in the selection and use of buffers. For example, the use of a sodium-potassium phosphate buffer (pH=6.2) caused kickout. The use of phthalic acid-NaOH buffer (pH=4.5) was tolerated, but there was a loss in printing and embossing quality. A formic acid-NaOH buffer (pH=3.7) was also tolerated, but again printing and embossing quality were reduced. Thus, while a buffering agent can be included in the composition of the invention, the use of such agents is not preferred and is generally not required.

In the preferred embodiment of the invention, the composition is substantially free of ammoniacal pH regulating or buffering agents. For example, it is preferred that the composition be substantially free of ammonia in gaseous or liquid form, alkylamino alcohols, and other amino compounds, since these compounds can cause kickout, or they may be offensive to workers and adversely affect environmental conditions.

The composition of the invention can be prepared using conventional techniques. For example, the foaming or blowing agent modifier or inhibitor can be dissolved or dispersed in the alcohol and/or water to give a concentrated solution or dispersion, e.g. 50% by weight. This can be accomplished with high speed mixing and may take several hours. The resulting solution or dispersion can be added to an aqueous thermoplastic or thermosetting printing ink, which is usually already at the desired shade. The ingredients are mixed in an amount sufficient to achieve the desired foam growth controlling agent concentration. Water can be added to give the desired finished viscosity or printing characteristics.

Several aqueous, foam-retarding, printing ink compositions of the invention have been prepared using these techniques. Following are recipes of compositions that have given good printing and embossing results.

| Extender (CIE-79)* | 78 g |
| Black Pigment Dispersed in Vehicle (CDK-33)* | 4 g |
| BTA Solution | 16 g |
| Water | 10 g |
| Viscosity = 40 sec. #2 Zahn cup. | |
| Extender (CIE-79)* | 84 g |
| BTA Solution | 16 g |
| Red Pigment Dispersed in Vehicle (CDR-32)* | 1 g |
| Water | 10 g |
| Viscosity = 39 sec. #2 Zahn cup. | |
| Extender (CIE-79)* | 15 lbs |
| BTA Solution | 3 lbs |
| Black Pigment Dispersed in Vehicle (CDK-33)* | 0.93 lbs. |
| Water | 7 lbs. |
| Viscosity = 34 sec. #2 Zahn cup. | |

*Available from Custom Chemicals Company.

The composition of the invention is useful as a foam retarding printing ink in a process for chemically embossing a self supporting, heat expandable or heat foamable resinous material. Resinous sheet materials can be prepared using conventional techniques. Following is a description of procedures that have produced acceptable printing and embossing results.

A layer of a conventional foamable and expandable resinous composition, such as a heat-expandable composition, can be cast on a suitable substrate, such as felt. A plasticized polyvinyl chloride resinous mixture containing a thermally decomposable blowing agent can be employed for this purpose. Pigments, stabilizers and the like can be incorporated in the resinous material.

The printing ink composition of the invention can be applied in the form of a design over at least a portion of the expandable layer. Preferably, the printing ink composition is applied to selected areas of the layer. Printing using a K-proofer has been found to be suitable for small scale production. The blade is fixed and pressure is set for substrate thickness. After printing, the design is allowed to dry for 1 minute at 150° F.

For large scale production, a conventional Rotogravure press can be employed using well-known printing conditions. In this case, the preferred printing viscosity for the composition of the invention is about 35 to about 50 sec. in a No. 2 Zahn cup. After printing, the design can be dried at a temperature of about 100° F. to about 250° F.

The foaming or blowing agent modifier or inhibitor is allowed to permeate into the heat-expandable composition containing the foaming or blowing agent. The layer can then be heated to selectively expand portions of the layer and thereby produce an embossed appearance due to the depressed regions proximate the portion of the printing design that contained the printing ink composition of the invention.

The embossed materials have many uses. For example, they can be used as floor coverings, wall coverings, furniture coverings, countertops, in automotive interiors and similar applications. The embossed materials can also be used as book coverings and in packaging applications. The embossed materials can be combined with conventional printed or unprinted transparent, translucent or opaque decorative or wear layers to enhance the appearance or functional characteristics of the resulting sheet materials.

In summary, this invention provides an aqueous foam-retarding printing ink composition that can meet State and Federal EPA emission standards for volatile organic solvents without the need for expensive solvent recovery or incineration equipment. The composition provides an improved environment for workers by eliminating most organic solvent vapors and ammoniacal pH regulating and buffering agents. The composition also provides a safer work environment by reducing the possibility of combustion and fire. The composition is adaptable for use with conventional printing equipment. In addition, the composition can be cleaned up at the printing location using only water. The composition has minimal tendency to block gravure cells on drying and provides acceptable print characteristics when compared to other foam growth-controlling printing ink compositions.

What is claimed is:

1. An aqueous, foam-retarding, printing ink composition consisting essentially of
   (A) about 40% to about 80% by weight of an aqueous thermoplastic or thermosetting printing ink;
   (B) about 1% to about 25% by weight of a foaming or blowing agent modifier or inhibitor selected from the group consisting of benzotriazole, fumaric acid, malic acid, hydroquinone, dodecanethiol, succinic anhydride or adipic acid;
   (C) about 0% to about 15% by weight of a water soluble or water dispersible alcohol having 1 to 6 carbon atoms; and (D) about 2% to about 33% by weight of water;
wherein the composition has a pH of about 3 to about 5 and the aqueous thermoplastic or thermosetting printing ink is compatible with water at said pH.

2. Printing ink composition as claimed in claim 1, wherein the foaming or blowing agent modifier or inhibitor is fumaric acid.

3. An aqueous, foam-retarding, printing ink composition consisting essentially of
   (A) about 40% to about 80% by weight of an aqueous thermoplastic or thermosetting printing ink;
   (B) about 1% to about 10% by weight of a foaming or blowing agent modifier or inhibitor, which is benzotriazole;
   (C) about 1% to about 15% by weight of a water soluble or water dispersible alcohol having 1 to 6 carbon atoms; and
   (D) about 2% to about 33% by weight of water;
wherein the composition has a pH of about 3 to about 5.

4. Printing ink composition as claimed in claim 3, wherein the printing ink comprises about 60% to about 70% by weight of the composition.

5. Printing ink composition as claimed in claim 4, wherein the benzotriazole comprises about 7% to about 10% by weight of the composition.

6. Printing ink composition as claimed in claim 5, wherein the alcohol comprises about 5% to about 10% by weight of the composition.

7. Printing ink composition as claimed in claim 6, wherein the alcohol is isopropanol.

8. Printing ink composition as claimed in claim 7, wherein the water is present in an amount sufficient for the composition to have a viscosity of about 35 sec. to about 50 sec. in a No. 2 Zahn cup.

9. Printing ink composition as claimed in claim 8, wherein the pH is about 4 to about 4.5.

* * * * *